(12) United States Patent
Finn

(10) Patent No.: US 10,541,937 B2
(45) Date of Patent: Jan. 21, 2020

(54) MULTI-LEVEL RESOURCE RESERVATION

(71) Applicant: Cisco Technology, Inc., San Jose, CA (US)

(72) Inventor: Norman Finn, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 160 days.

(21) Appl. No.: 15/653,511

(22) Filed: Jul. 18, 2017

(65) Prior Publication Data
US 2019/0028402 A1     Jan. 24, 2019

(51) Int. Cl.
| | |
|---|---|
| *H04L 12/913* | (2013.01) |
| *H04L 12/725* | (2013.01) |
| *H04L 12/911* | (2013.01) |
| *H04L 12/857* | (2013.01) |
| *H04L 12/715* | (2013.01) |
| *H04L 12/927* | (2013.01) |
| *G06F 9/50* | (2006.01) |

(52) U.S. Cl.
CPC .......... *H04L 47/724* (2013.01); *H04L 45/302* (2013.01); *H04L 45/64* (2013.01); *H04L 47/2491* (2013.01); *H04L 47/72* (2013.01); *H04L 47/74* (2013.01); *H04L 47/746* (2013.01); *H04L 47/781* (2013.01); *H04L 47/782* (2013.01); *H04L 47/803* (2013.01); *H04L 47/822* (2013.01); *G06F 9/5005* (2013.01); *G06F 9/5027* (2013.01); *H04L 47/70* (2013.01); *H04L 47/805* (2013.01)

(58) Field of Classification Search
CPC .......... H04L 29/06523; H04L 41/5067; H04L 45/30–306; H04L 47/2491; H04L 47/70–746; H04L 47/805–806; H04L 47/82–823; H04L 47/827; H04L 65/80; H04L 67/32–322
See application file for complete search history.

(56) References Cited

U.S. PATENT DOCUMENTS

| | | | |
|---|---|---|---|
| 9,455,933 B2 | 9/2016 | Finn et al. | |
| 9,763,140 B2 * | 9/2017 | McBride | H04W 28/24 |

(Continued)

FOREIGN PATENT DOCUMENTS

CN     102014159     4/2011

OTHER PUBLICATIONS

A. Bader, et al., "QoS signaling across heterogeneous wired/wireless networks: resource management in Diffsery using the NSIS protocol suite",The Second International Conference on Quality of Service in Heterogeneous Wired/Wireless Networks, Aug. 2005.*

(Continued)

*Primary Examiner* — Brendan Y Higa
(74) *Attorney, Agent, or Firm* — Meunier Carlin & Curfman LLC

(57) ABSTRACT

The present disclosure is directed to a multi-level resource reservation system that obviates one or more of the problems due to limitations and disadvantages of the related art. The multi-level resource reservation system creates, or modifies existing, peer-to-peer protocol(s) to complete a continuous chain of configured ports to support QoS feature(s), e.g., bound latency and guaranteed jitter, for a data flow that traverses an arbitrary sequence of bridges, routers, and virtual links.

20 Claims, 4 Drawing Sheets

(56) References Cited

U.S. PATENT DOCUMENTS

| | | | |
|---|---|---|---|
| 2003/0093526 A1* | 5/2003 | Nandagopalan | ............................ H04L 29/06027 709/225 |
| 2009/0049175 A1* | 2/2009 | Finn | ...................... H04L 12/462 709/226 |
| 2009/0097403 A1* | 4/2009 | Polk | ........................ H04L 45/00 370/231 |
| 2009/0304018 A1 | 12/2009 | Torger et al. | |
| 2012/0106463 A1* | 5/2012 | McBride | ............... H04W 28/24 370/329 |
| 2014/0022938 A1 | 1/2014 | Olsen | |

OTHER PUBLICATIONS

Awduche, D., "RSVP-TE: Extensions to RSVP for LSP Tunnels," Network Working Grouping, RFC 3209, 2001, 61 pages.

International Search Report and Written Opinion, dated Dec. 17, 2018, received in connection with International Patent Application No. PCT/US2008/042593.

Finn, H., et al., "Deterministic Networking Architecture," draft-ietf-detnet-architecture-02, Det Net, Internet-Draft, 2017, 44 pages.

Shiomoto, K., et al., "Requirements for GMPLS-Based Multi-Region and Multi-Layer Networks (MRN/MLN)," Network Working Group, RFC 5212, 2008, 28 pages.

\* cited by examiner

MULTI-LEVEL RESOURCE RESERVATION

TECHNICAL FIELD

Embodiments of the present invention relate to resource reservation in a network, specifically multiple level peer-to-peer reservation protocols in a deterministic network.

BACKGROUND

Reservations protocols are transport layer protocols designed to reserve resources across a network for an integrated services Internet. For audio, video, and other media streams, as well as various control system protocols, guaranteed quality-of-service (QoS) network services are desired to bound delay and minimize jitter that can affect the quality of such streams.

Existing L2 (Layer-2) or L3 (Layer-3) peer-to-peer protocols are not designed for a mixed bridged/routed environment, which are further complicated by overlay technologies.

BRIEF DESCRIPTION OF THE DRAWINGS

The accompanying figures, which are incorporated herein and form part of the specification, illustrate multi-level resource reservation. Together with the description, the figures further serve to explain the principles of the multi-level resource reservation described herein and thereby enable a person skilled in the pertinent art to make and use the multi-level resource reservation.

DESCRIPTION OF EXAMPLE EMBODIMENTS

Overview

Figure 1:
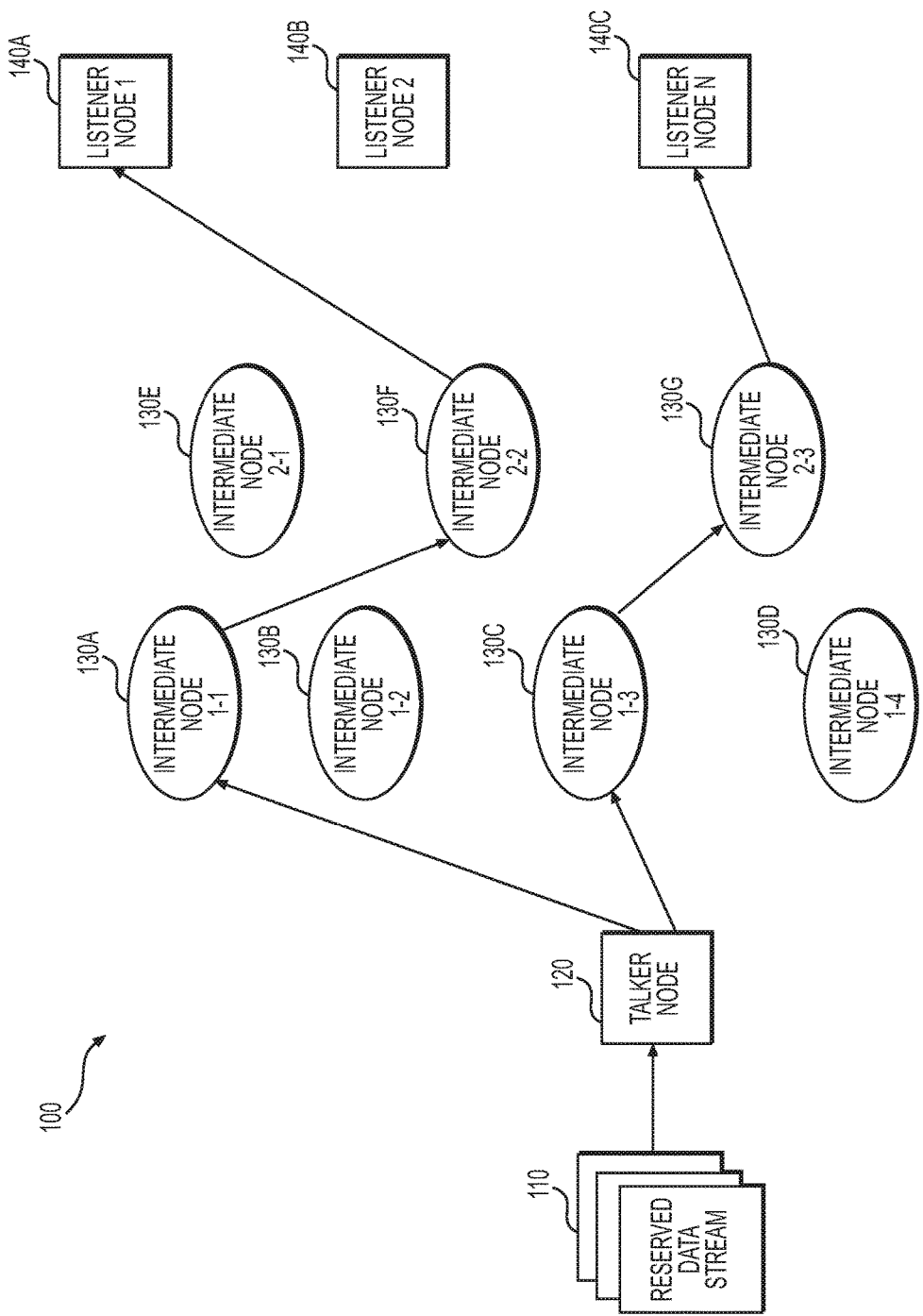
FIG. 1 provides a diagram of an exemplary network environment in which systems and methods associated with certain disclosed embodiments may be implemented.

The present disclosure is directed to a multi-level resource reservation system that obviates one or more of the problems due to limitations and disadvantages of the related art. The multi-level resource reservation system creates, or modifies existing, peer-to-peer protocol(s) to complete a continuous chain of configured ports to support QoS feature(s), e.g., bound latency and guaranteed jitter, for a data flow that traverses an arbitrary sequence of bridges, routers, and virtual links. This includes passing parameters that must traverse the physical chain, based on protocols that each see only their peers at some networking layer. Notably, the peer-to-peer protocol distributes the reservation operation such that a centralized controller (e.g., an independent controller in the network, separate from the talker or listener nodes) is not required.

In another aspect, the exemplified system and method facilitate the propagation of accumulated worst-case jitter and latency through the series of bridge and router ports through which the data will travel.

As embodied and broadly described herein, one aspect, relates to a method of making a multiple level resource reservation for a deterministic data stream in a peer-to-peer manner. The method includes making a resource reservation request at a first layer; and subsequently requesting a resource reservation request at a second layer, wherein the second layer is higher than the first layer; wherein, if the resource reservation request at the first layer fails, then failing the resource reservation at the second layer; and wherein if the resource reservation request at the second layer fails, then withdrawing the resource reservation at the first layer.

In some embodiments, the resource reservation request at the first layer is made across a series of adjacent nodes, the series of adjacent nodes having a starting node and an ending node.

In some embodiments, the series of adjacent nodes includes at least one intermediate node, the method further comprising, if the resource reservation request at the first layer can be made, receiving at the at least one intermediate node and the starting node an acknowledgment that the resource reservation request at the first layer can be made.

In some embodiments, the resource reservation request at a second layer is made from a first node to a second node, where the first node is the starting node and the second node is the ending node.

In some embodiments, the method includes, if the resource reservation request at the second layer can be made, receiving at the first node an acknowledgment that the resource reservation request at the second layer can be made.

In some embodiments, the resource reservation request at the first layer includes one or more transmission parameter(s), or a set thereof, related to transmission of the data stream.

In some embodiments, the one or more transmission parameter(s) associated with the request at the first layer includes at least one of bandwidth, delay, latency, and jitter.

In some embodiments, the one or more transmission parameter(s) associated with the request at the first layer is carried through the series of nodes and updated in the reservation request at the first layer between each adjacent nodes in the series of adjacent nodes.

In another aspect, another method of making a multiple level resource reservation in a peer-to-peer manner is disclosed. The method includes making a resource reservation request across a series of adjacent nodes in one of a first layer and a second layer, the first layer and second layer being adjacent, the series of adjacent nodes having a starting node and an ending node; and passing one or more transmission parameter(s), or a set thereof, between adjacent nodes in different ones of the first layer and the second layer according to an interworking function.

In some embodiments, protocol data units in the first layer include one or more transmission parameter(s), or a set thereof, for the first layer and the second layer between adjacent nodes in the first layer but not between adjacent nodes in the first layer and the second layer.

In some embodiments, the internetworking function generates one or more new transmission parameter(s) for the first layer after the reservation request passes between the second layer and the first layer.

In some embodiments, the one or more transmission parameter(s) for the first layer includes at least one of bandwidth, delay, latency, and jitter.

In some embodiments, the method includes passing an acknowledgement that the reservation request is successful from the ending node to the starting node.

In some embodiments, the intermediate nodes are located between the starting node and the ending node, and the reservation request is made at each intermediate node.

In some embodiments, protocol data units in the first layer include one or more transmission parameter(s), or a set thereof, for the first layer and the second layer between adjacent nodes in the first layer but not between adjacent nodes in the first layer and the second layer.

In some embodiments, the one or more transmission parameter(s), or the set thereof, for the first layer includes at least one of bandwidth, delay, latency, and jitter.

In some embodiments, the internetworking function generates one or more new transmission parameter(s), or a set thereof, for the first layer after the reservation request passes between the second layer and the first layer.

The method includes passing an acknowledgement that the reservation request is successful from the ending node to the starting node.

In yet another aspect, a method is disclosed for a multiple level resource reservation of a deterministic data stream in a peer-to-peer protocol. The method includes making one or more resource reservation requests in a peer-to-peer manner to a corresponding first set of one or more network nodes operating a first network layer of a network; subsequently requesting one or more resource reservation requests in a peer-to-peer manner to a corresponding second set of one or more network nodes operating a second network layer, wherein the second network layer is higher than the first network layer, wherein for each resource reservation request to a next network nodes operating the second network layer, the network node of the second set making one or more resource reservation requests with to a corresponding set of one or more network nodes in the first network layer; failing the resource reservation at the second network layer if any resource reservation requests associated with the first network layer fails; and withdrawing the one or more resource reservation requests from the first set of one or more network nodes operating the first layer if a corresponding subsequent resource reservation request in the second network layer fails.

Additional advantages of the embodiment will be set forth in part in the description which follows, and in part will be obvious from the description, or may be learned by practice of the embodiment. The advantages of the disclosure will be realized and attained by means of the elements and combinations particularly pointed out in the appended claims. It is to be understood that both the foregoing general description and the following detailed description are exemplary and explanatory only and are not restrictive of the embodiments, as claimed.

It is to be understood that both the foregoing general description and the following detailed description are exemplary and explanatory only, and are not restrictive of the embodiments as claimed.

Reference will now be made in detail to embodiments of the multi-level resource reservation with reference to the accompanying figures, in which like reference numerals indicate like elements.

It will be apparent to those skilled in the art that various modifications and variations can be made in the present embodiment without departing from the spirit or scope of the embodiment. Thus, it is intended that the present embodiment cover the modifications and variations of this embodiment provided they come within the scope of the appended claims and their equivalents.

Example Deterministic Network Environment

FIG. 1 illustrates an exemplary network environment 100 in which systems and methods associated with certain disclosed embodiments may be implemented. As illustrated in FIG. 1, network environment 100 may be any network that allows one or more talker nodes 120 to transfer data streams, such as reserved data stream 110, to one or more listener nodes 140a-140c via a network path through one or more intermediate node(s) 130a-130g. It is contemplated that network environment 100 may include additional and/or different numbers and types of nodes than those shown in FIG. 1 and explained in the exemplary embodiments described herein.

A Talker node 120, intermediate nodes 130a-130g, and listener nodes 140a-140c, may each embody a piece of network routing equipment, such as a network router, bridge, or switch, configured to receive packetized data, queue the data for transmission through the node at a reserved time to stay within a reservation bound, determine the next node in the network to which to send the packetized data, and transmit the data to the next node.

As illustrated in the network environment 100 of FIG. 1, a talker node 120 may receive a reserved data stream request. A "reserved" data stream request refers to any request for allocated bandwidth with constraints that invokes the presently disclosed procedure for dedicated resource allocations within a deterministic schedule for one or more ports of talker node 120, one or more intermediate nodes 130a-130g, and one or more of listener nodes 140a-140c. Talker node 120 is configured to receive a "reserved" data stream request and determine resources that must be dedicated by each node along the transmission path to the data stream destination (i.e., one or more of listener nodes 140a-140c) in order to guarantee the desired transmission parameters (e.g., maximum jitter, minimum or maximum latency, resilience to network failures, maximum loss rate, maximum bits/second, maximum packet size, maximum burst size, observation interval, etc.) requested in the reserved data stream request.

Talker node 120 may be configured to identify one or more intermediate nodes 130a-130g that provide an adequate communication path between talker node 120 and one or more requested listener nodes 140a-140c. Talker node 120 may be configured to determine the appropriate path based on a number of criteria, such as, for example, the available capacity of each of the candidate nodes, the latency between candidate nodes, and other network performance and/or capacity metrics.

According to one example, talker node 120 may receive a request for a reserved data stream 110 and determine, based on information contained in the request, that the reserved data stream is to be delivered to listener nodes 140a, 140c. Talker node 120 may identify a path between talker node 120 and listener node 140a that travels through intermediate node 1-1 (130a) and intermediate node 2-2 (130f) explained above, although there may be a number of other network paths between talker node 120 and listener node 140a, talker node 120 may determine the most suitable path based on a number of network performance criteria, such as availability of resource sufficient to satisfy the requirements of the requested reserved data stream 110. In similar fashion, talker node 120 may identify a path between talker node 120 and listener node 140c that travels through intermediate node 1-3 (130c) and intermediate node 2-3 (130g).

In identifying the path between the talker node 120 and listener node 140*a*, a single candidate path may be evaluated at any given time until a suitable path is identified. As such, resource reservation requests for a candidate path may propagate through intermediate nodes 130*a*-130*g* until a suitable path is identified or a decision can be made that the candidate path is not suitable to meet the resource requirements of the request for a reserved data stream 110. For example, a determination may be made that the candidate path is not suitable based on i) resource constraints from one of the intermediate nodes 130*a*-130*g* and/or ii) aggregated resource constraints along the candidate path not meeting requirements of the request for a reserved data stream 110. If it is decided that the candidate path is not suitable to meet the resource requirements for the reserved data stream 110, the resource reservations may be released and a subsequent candidate path may be evaluated.

In alternative embodiments, a plurality of candidate paths between the talker node 120 and listener node 140*a* may be evaluated in parallel (e.g., using RSVP-TE or other protocols). Resource reservation requests may propagate through intermediate nodes 130*a*-130*g* for each of the plurality of candidate paths until a suitable path is identified in one of the plurality of candidate paths. If a suitable path is identified, the resource reservations on the other of the plurality of candidate paths are released. Likewise, if a determination is made that one of the plurality of candidate paths is not suitable to meet the resource requirements of the request for a reserved data stream 110, the resource reservations of the corresponding candidate path may be released. For example, a determination may be made that one of the plurality of candidate paths is not suitable based on i) resource constraints from one of the intermediate nodes 130*a*-130*g* and/or ii) aggregate resource constraints along the one of the plurality of candidate paths not meeting requirements of the request for a reserved data stream 110.

In some implementations, the number of candidate paths that are evaluated at any given time or the criteria for the propagation with respect to intermediate nodes is configurable via a parameter established in the multi-level reservation protocol. For example, the talker node 120 may be configured to set the number of candidate paths to evaluate at a time upon receiving a request for a reserved data stream 110.

Once the path for the reserved data stream has been identified, in some embodiments, each of the nodes along the path is configured to dedicate resources to sufficiently satisfy the network performance requirements contained in the request for the reserved data stream 110. Additional discussion of a deterministic network is provided in U.S. Pat. No. 9,455,933, which is incorporated by reference herein in its entirety.

Example Multi-Level Reservation Protocol

The exemplified methods and system is configured to build an uninterrupted chain of data plane queues that have been configured by the multi-level reservation protocol to support the deterministic data flow(s) for which reservations have been made in a deterministic network environment.

Figure 2:
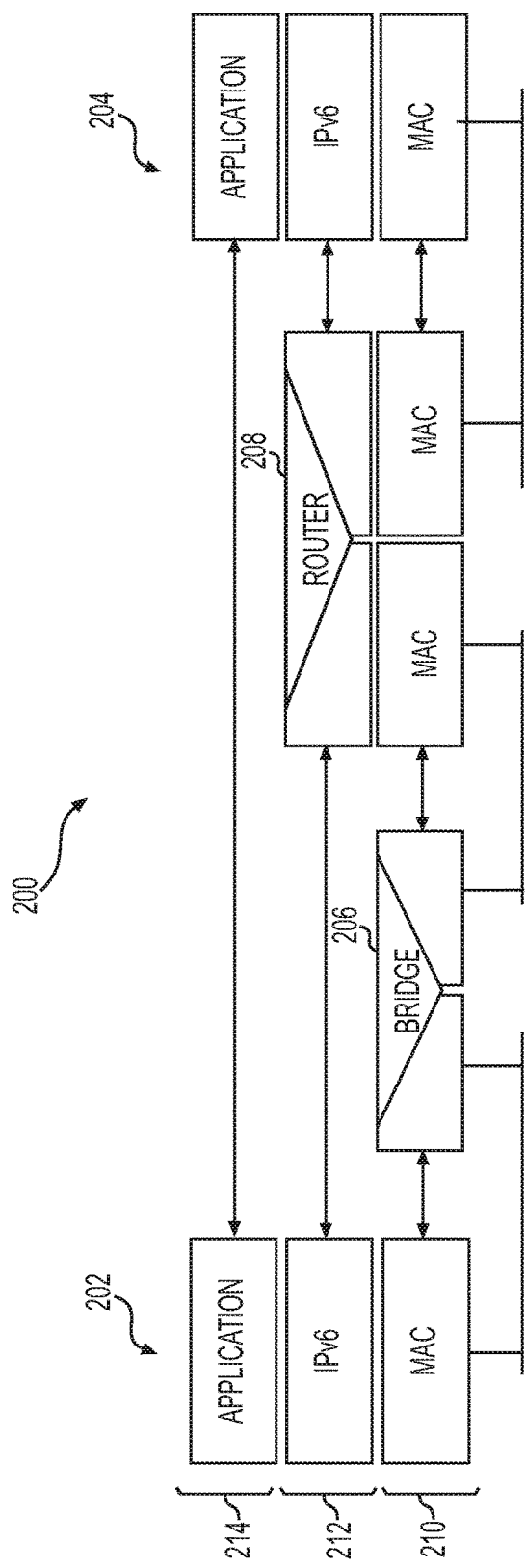
FIG. 2 illustrates end to end systems connected to bridges and routers in three layer exemplary architecture.

FIG. 2 illustrates an end-to-end system 200 comprising of network edge nodes 202, 204 (e.g., Talker or Listener nodes) connected via a multi-level environment. As shown in FIG. 2, bridges 206 and routers 208 in a three-layer exemplary architecture is shown that includes a data link layer 210 (Layer 2), a network layer 212 (Layer 3) and an application layer 214 (Layer 7). The principles of the present disclosure are not limited to these particular OSI layers.

The multi-level resource reservation system according to principles described herein facilitates an exemplary peer-to-peer reservation scheme that facilitates multi-level reservations such that the end systems (e.g., 202, 204) do not need to know (or care) whether intervening or adjacent network nodes include bridges or routers (e.g., is Layer 2 or Layer 3). The exemplary reservation scheme determines whether an adjacent network node is in a same reservation level (e.g., Level N) or an adjacent reservation level (e.g., Level N−1 or N+1) so a multi-hop reservation at Level N can traverse one or more Level N−1 and N+1 nodes adjacent to the Level N node. In addition, the exemplary multi-level resource reservation system facilitates operation in which Level N virtual links are carried over a Level N+m (m≥0) tunnel or a Level N−m (m>0) tunnel.

Separate Reservations Peer-To-Peer Multi-Level Resource Reservation

Figure 3:
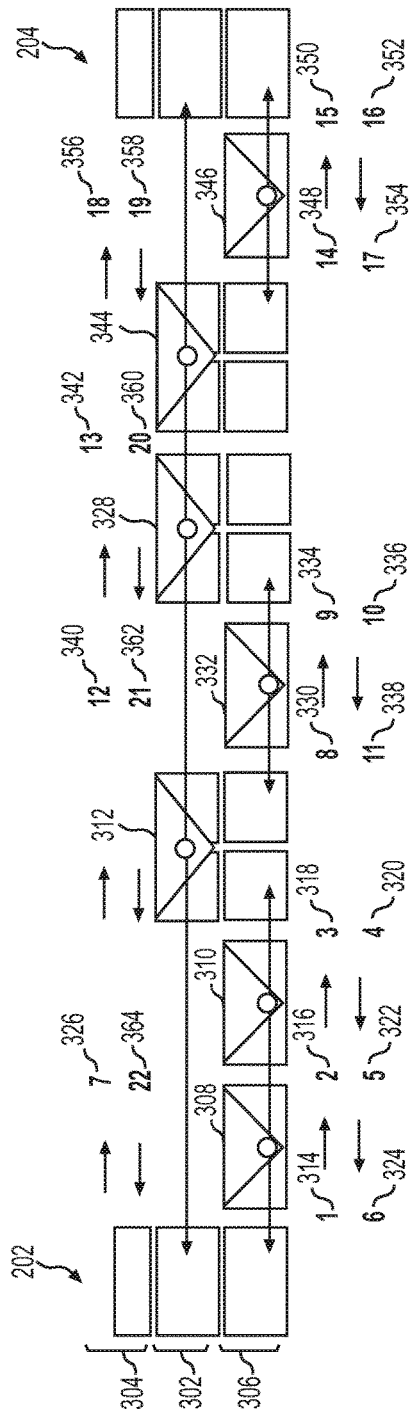
FIG. 3 illustrates a system for making separate reservations at all layers (or multiple layers) in an architecture.

FIG. 3 illustrates a method for operating peer-to-peer multi-level resource reservations in a deterministic network.

As shown in FIG. 3, separate reservations are made, in a peer-to-peer manner, at all levels along a network path between the first network node 202 (e.g., Talker node) and a second network node 204 (e.g., Listener node). Referring to FIG. 3, each set of stacked rectangles represents a node in a reserved path. Three levels are represented in FIG. 3, with the middle level 302 being N, the upper level 304 being N+1 and the lower level 306 being N−1, though the reservations may be made with any numbers of layers. In some implementations, the middle level 302 is an L3 network layer in the OSI model, the upper level 304 is a layer higher than the L3 network layer (e.g., application layer) in the OSI model, and the lower level 306 is the L2 data link layer in the OSI model.

Looking at FIG. 3, a Talker node (e.g., 202) and a Listener node (204) has been identified in this embodiment. The Talker node 202 may receive a request for a reserved data stream 110, where the request includes desired transmission parameters for the reserved data stream 110 (e.g., maximum jitter, minimum or maximum latency, resilience to network failures, maximum loss rate due to congestion, maximum bits/second, maximum packet size, maximum burst size, observation interval, etc.). The request may be received at any of the levels 302, 304, 306. In the example shown in FIG. 3, the request is received at the middle level 302 N. The Talker node 202 determines resources that must be dedicated in order to guarantee the requested transmission parameters. In some embodiments, a proposed path for a reserved data stream 110 has been identified by a network control protocol (e.g. RSVP-TE). In other embodiments, the exemplary method can be used to identify a path for the reserved data stream 110.

The path may include one or more segments between two N level nodes (e.g., nodes 312 and 328) with at least one intermediate node at an N−1 level (e.g., node 332), referred to hereinafter as intermediate node segments. An upstream node (e.g., node 312) of the intermediate node segment on the path may receive an N level resource reservation.

According to the exemplary method, for the N level resource reservation, at each intermediate node segment, a lower-level reservation (e.g., N−1 level reservation) is attempted, first. That is, the lower-level reservation is attempted between each of the nodes in the intermediate node segment, including the two N level nodes that bound the intermediate node segment. To this end, a resource reservation request received at level N in a node triggers a level N−1 resource reservation request when an adjacent node downstream on the path is a level N−1 node. For example, as shown in FIG. 3 and described in more detail below, node 312 receives the level N resource request 326, which in turn triggers a level N−1 resource request 330 to the adjacent level N−1 node 332.

If a lower-level reservation (e.g., N−1 level reservation) is made between each of the nodes in the intermediate node segment, then the next hop of the next higher-layer reservation is requested. For example, upon making an N−1 level resource reservation between two N level nodes and the at least one intermediate N−1 level node, an N level resource reservation may be attempted between the two N level nodes.

If the lower-level reservation attempt fails between any of the nodes in the intermediate node segment, failure of the upper-level request is returned. For example, if an N−1 level reservation attempt fails between any of the nodes in the intermediate node segment, then a failure reply may be sent in response to the resource reservation request at the upstream node of the intermediate node segment.

Upon an N level node receiving a failure reply for an N level resource reservation request from a downstream N level node, the N level node may send another N level resource reservation request to a different downstream N level node along a different segment. The different segment could be another intermediate node segment or an adjacent node segment where two N level nodes are immediately adjacent to each other without any N−1 level intermediate nodes. In this way, the path may be developed in a peer-to-peer manner between the Talker node 202 and the Listener node 204.

If an upper-level request failed, the lower-level reservation already made is withdrawn and the upper-layer request failure is returned. For example, upon an N level resource reservation request failing between the two N level nodes in the intermediate node segment, the N−1level resource reservations between each of the nodes in the intermediate node segment, including the two N level nodes that bound the intermediate node segment, are withdrawn. The N level node may send a resource withdraw message to be propagated along to each of the nodes in the intermediate node segment withdrawing the N−1 level resource reservations. As above, upon the upper-level request failure being returned, another upper-level request may be issued along a different segment.

During operation, each respective node may not know a lowest level of an adjacent node, but resource reservation can be performed if a layer N and at least one adjacent layer, such as N+1 or N−1, is known. Reservation of nodes at Layer N−1would be made first, e.g., 1-3 (shown as 314, 316, 318). If reservation at Level N−1 can be performed, then reservation at level N+1 is performed. If the lower reservation fails, failure of upper request is returned. If an upper request fails, lower reservation already made is withdrawn, and upper failure is passed on.

In the example shown in FIG. 3, the Talker node 202 (e.g., a host) may receive a request for a reserved data stream 110, where the request includes desired transmission parameters for the reserved data stream 110. The request for the reserved data stream 110 is received at the middle level 302 (e.g., the network layer of the OSI model). The Talker node 202 may also be referred to as an N level node. In response, the Talker node 202 may identify a first segment for a candidate path from the Talker node 202 to the Listener node 204. The first segment is an intermediate node segment including the Talker node 202, a middle level 302 node 312, and two intermediate lower level 306 nodes 308, 310. The middle level 302 node 312 may also be referred to as an N level node. The intermediate lower level 306 nodes 308, 310 may also be referred to as N−1level nodes.

Because the first segment is an intermediate node segment, the middle level 302 request for the reserved data stream 110 triggers a lower level 306 resource reservation request to the immediately adjacent node on the first segment. Accordingly, the Talker node 202 sends a lower level 306 reservation request "1" 314 (e.g., a L2 request such as a MSRP declaration) with a requested QoS to node 308 (e.g., a bridge); node 308 propagates the lower level 306 reservation request as request "2" 316 to a peer node 310 (e.g., a bridge); node 310 propagates the lower level 306 reservation request as request "3" 318 (e.g., a L2 request such as a MSRP declaration) to a peer node 312 (e.g., a router).

MSRP, defined in IEEE Std 802.1Q-2014 Clause 35, is a resource reservation protocol. MSRP is tied to specific data plane techniques so that an MSRP reservation can deliver absolute zero congestion loss and bounded end-to-end latency for a data stream. MSRP works two-way—with an Advertisement from the Talker and the resource reservation coming back. MSRP works in bridged networks. Additional description of MSRP declaration and messaging format is provided in IEEE Standard 802.1Q-2014, which is incorporated by reference herein in its entirety.

To ensure that lower level 306 reservation is established among lower level 306 nodes 308, 310 (e.g., bridges), confirmation of the reservation is made once a continuous reservation chain has been established along the segment. In FIG. 3, confirmation of the reservation is made following a continuous reservation chain is established at the lower level 306 nodes 308, 310. As shown, node 312 sends a reservation acknowledgement message "4" 320 (e.g., a L2 request such as a MSRP ready declaration) to the lower level 306 peer node 310; node 310 then sends a reservation acknowledgement message "5" 322 (e.g., a L2 request such as a MSRP ready declaration) to lower level 306 peer node 308; and node 308 sends a reservation acknowledgement message "6" 324 (e.g., a L2 request such as a MSRP ready declaration) to the Talker node 202.

With the lower level 306 reservation completed, the exemplified method attempts to make a next higher level reservation, the middle level 302 reservation in the example shown in FIG. 3. In FIG. 3, the Talker node 202 sends a middle level 302 reservation request "7" 326 (e.g., a L3 request such as a RSVP-TE Path Message) to the next hop node 312.

RSVP-TE, defined is RFC3209, is a Layer 3 protocol that works in routed (e.g., Label Switched) networks. RSVP-TE works two way, from Talker to Listener establishing the path, then back to reserve resources. Additional description of RSVP-TE is provided in RFC3209, which is incorporated by reference herein in its entirety.

As discussed above, a failed lower level 306 reservation request at any of the nodes 308, 310, 310 on the first segment fails (e.g., if a node does not have sufficient resources to meet the requested QoS) will result in a failure of the middle level 302 reservation request. In the event of such a failure, the Talker node 202 will evaluate another segment (not shown) for establishing the path from the Talker node 202 to the Listener node 204 for the reserved data stream 110.

Referring still to FIG. 3, at node 312, similar to the hop from node 202 to node 312, upon the node 312 receiving the middle level 302 reservation request "7" 326 (e.g., a L3 request such as a RSVP-TE Path Message), the node 312 may identify a second segment for a candidate path from the Talker node 202 to the Listener node 204. The second segment is also an intermediate node segment including the middle level 302 node 312, a middle level 302 node 328, and an intermediate lower level 306 node 332. The middle level 302 node 328 may also be referred to as an N level node. The intermediate lower level 306 node 332 may also be referred to as an N−1 level node.

Because the second segment is an intermediate node segment, the middle level 302 reservation request "7" 326 triggers a lower level 306 reservation request to the immediately adjacent node on the second segment. Accordingly, the node 312 attempts to make the lower level 306 reservation to a next hop (shown as node 328). Node 312 propagates the lower level 306 reservation request as request "8" 330 (e.g., a L2 request such as a MSRP declaration) to a peer node 332 (e.g., a bridge); node 332 propagates the lower level 306 reservation request as request "9" 334 (e.g., a L2 request such as a MSRP declaration) to a peer node 328 (e.g., a router). Similar to the hop from node 202 to node 312, if a continuous chain is established in the lower level 306 reservation, node 328 sends a reservation acknowledgement message "10" 336 (e.g., a L2 request such as a MSRP ready declaration) to the lower level 306 peer node 332; node 332 then sends a reservation acknowledgement message "11" 338 (e.g., a L2 request such as a MSRP ready declaration) to node 312.

With the lower level 306 reservation completed in the second segment, the exemplified method attempts to make a next higher level reservation, the middle level 302 reservation in the example shown in FIG. 3. In FIG. 3, the node 312 sends a middle level 302 reservation request "12" 340 (e.g., a L3 request such as a RSVP-TE Path Message) to the next hop node 328.

At node 328, as above, upon the node 328 receiving the middle level 302 reservation request "12" 340 (e.g., a L3 request such as a RSVP-TE Path Message), the node 328 may identify a third segment for a candidate path from the Talker node 202 to the Listener node 204. As shown in FIG. 3, the third segment is an adjacent node segment. That is, the N level node 328 is immediately adjacent to another N level node 344 without any N−1 level intermediate nodes on the third segment. Accordingly, upon the node 328 receiving the middle level 302 reservation request "12" 340 (e.g., a L3 request such as a RSVP-TE Path Message), the node 328 may send a middle level 302 reservation request "13" 342 (e.g., a L3 request such as a RSVP-TE Path Message) to the next hop node 344.

At node 344, as above, upon the node 344 receiving the middle level 302 reservation request "13" 342 (e.g., a L3 request such as a RSVP-TE Path Message), the node 344 may identify a fourth segment for a candidate path from the Talker node 202 to the Listener node 204. As shown in FIG. 3, the fourth segment is an intermediate node segment including the middle level 302 node 344, the Listener node 204, and an intermediate lower level 306 node 346. The Listener node 204 may also be referred to as an N level node. The intermediate lower level 306 node 346 may also be referred to as an N−1 level node.

Because the fourth segment is an intermediate node segment, the middle level 302 reservation request "13" 342 triggers a lower level 306 reservation request to the immediately adjacent node on the fourth segment. Similar to the hop from node 312 to node 328, node 344 attempts to make the lower level 306 reservation to a next hop (in this case, the Listener node 204). Node 344 propagates the lower-layer reservation request as request "14" 348 (e.g., a L2 request such as a MSRP declaration) to a peer node 346 (e.g., a bridge); node 346 propagates the lower-layer reservation request as request "15" 350 (e.g., a L2 request such as a MSRP declaration) to the Listener node 204; Listener node 204 sends a reservation acknowledgement message "16" 352 (e.g., a L2 request such as a MSRP ready declaration) to the lower-layer peer node 346; and node 346 then sends a reservation acknowledgement message "17" 354 (e.g., a L2 request such as a MSRP ready declaration) to node 344.

With the lower level 306 reservation completed in the fourth segment, the exemplified method attempts to make a next higher level reservation, the middle level 302 reservation in the example shown in FIG. 3. In FIG. 3, the node 344 sends a next-layer reservation request "18" 356 (e.g., a L3 request such as a RSVP-TE Path Message) to the Listener Node 204.

The reservation confirmation at the level of the initial request for a reserved data stream 110 (N level or the middle level 302) is then confirmed. As shown in the example of FIG. 3, the Listener node 204 sends a reservation acknowledgement message to the Talker node 202 by sending a reservation acknowledgement message "19" 358 (e.g., a L3 request such as a RSVP Resv message) to node 344; node 344 propagates a reservation acknowledgement message "20" 360 (e.g., a L3 request such as a RSVP Resv message) to node 328; node 328 propagates a reservation acknowledgement message "21" 362 (e.g., a L3 request such as a RSVP Resv message) to node 312; and node 312 propagates a reservation acknowledgement message "22" 364 (e.g., a L3 request such as a RSVP Resv message) to the Talker Node 202. To this end, FIG. 3 shows request for service is made and confirmed for each lower-layer level device, then at the current layer level device.

As discussed above, the sequencing among the individual network nodes in the network facilitates a multi-level resource reservation system in which individual network nodes manages the reservation such that a centralized controller (e.g., an independent controller in the network, the talker node, or listener node) is not required.

In another aspect, an accumulated latency parameter is included in the reservation messages being propagated during the reservation at the multiple levels to establish the complete chain of configured queues that carry parameters such as the accumulated latency through the protocols on the multiple levels. To do this, every relay node along the path, whether a bridge or a router, allocates resources to a given stream to ensure that the stream gets its desired quality of service (QoS).

In some embodiments, the total accumulated delay or another transmission parameter, or set thereof, is inserted as a parameter in a label (e.g., MPLS label) of the reservation message.

In some embodiments, each node inserts into the N-layer reservation request a total accumulated delay. The total accumulated delay may include a first aggregated delay between the instant node and a next hop over the set of lower-level devices and a second aggregated delay from the Talker node to the instant node. Determining the total accumulated delay along the path according to this method may be referred to as a source summation delay determination. For example, in the example shown in FIG. 4, Node "A" (corresponding to Talker node 202 in FIG. 3) inserts a label with a total L2 delay (e.g., delay "D1"+delay "D2") associated with reservation path "1" 402 into the L3 request "2" 404 (corresponding to reservation request "7" 326). The inserted label may be a single summed value, in some embodiments. In other embodiments, the inserted label is a concatenated list of individual delays.

Figure 4:
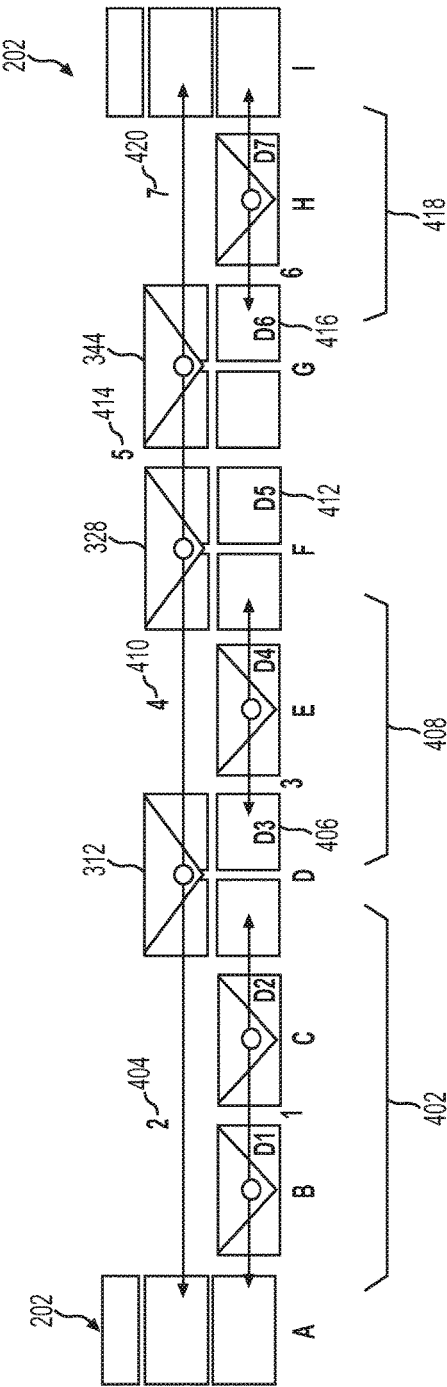
FIG. 4 illustrates latency along a network reservation path.

Referring still to FIG. 4, similarly, node "D" (corresponding to node 312) sums or combines (accumulated delay in the L3 request "2" 404)+delay "D3" 406 (its own delay)+ (total delay from L2 reservation "3" 408) into L3 request "4" 410. Node "F" (corresponding to node 328) sums or combines (accumulated delay in the L3 request "4" 410)+delay "D5" 412 (its own delay) into L3 request "5" 414. Node "G" (corresponding to node 344) sums or combines (accumulated delay in the L3 request "5" 414)+delay "D6" 416 (its own delay)+(total delay from L2 reservation "6" 418) into L3 request "7" 420.

In some embodiments, rather than including the aggregated delay between the instant node and a next hop over the set of lower-level devices each node may inserts an identifier associated with the reservation along the set of lower-level devices and an aggregated delay from the Talker node to the instant node in the N-layer request. Determining the total accumulated delay along the path according to this method may be referred to as a destination summation delay determination.

For example, in the example shown in FIG. 4, Node "A" (corresponding to Talker node 202 in FIG. 3) inserts a label with a first identifier associated with reservation path "1" 402 into the L3 request "2" 404 (corresponding to reservation request "7" 326). Similarly, node "D" (corresponding to node 312) includes a second identifier associated with the reservation path "3" 408 along with a sum of the result of the delay associated with the first identifier+delay "D3" 406 (its own delay) into L3 request "4" 410. Node "F" (corresponding to node 328) sums or combines (the result of the delay associated with the first and second identifiers)+delay "D5" 412 (its own delay) into L3 request "5" 414. Node "G" (corresponding to node 344) includes a third identifier associated with the reservation path "6" 418 along with a sum or combination (the result of the delay associated with the first and second identifies)+delay "D6" 416 (its own delay) into L3 request "7" 420. The Listener node 204 then determines the total accumulated delay based on a sum or combination of the sum received in the request "7" 420 along with the result of the delay associated with the third identifier.

While the examples provided above are directed to the determination of a total accumulated delay along the path, other QoS or transmission parameters (e.g., jitter, latency, resilience to network failures, maximum toss rate due to congestion, maximum bits/second, maximum packet size, maximum burst size, observation interval, etc.) may be accumulated along the path as aggregate transmission parameters. Parameters such as the accumulated maximum guaranteed end-to-end latency are carried and incremented along the path of the reservation by the protocol. Thus, end-to-end latency can be computed and reported to the users. Also, that latency can be compared to the latency required by the stream, and the reservation can fail if that requirement is not met.

As discussed above, the request for a reserved data stream 110 includes desired transmission parameters. If the end-to-end aggregate transmission parameters of a candidate path do not conform to the desired transmission parameters for the reserved data stream 110, the candidate path will fail and the resource reservations made along the candidate path may be released.

Peer-To-Peer Multi-Level Resource Reservation System via Inter-Working Function

Figure 5:
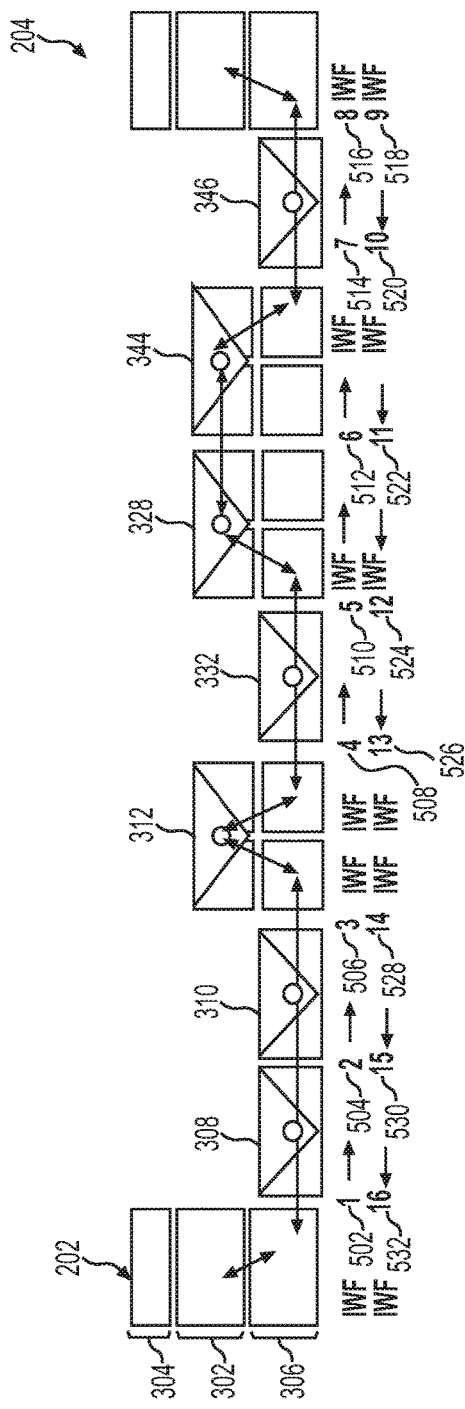
FIG. 5 illustrates another embodiment in which separate reservations are combined into a single multi-level reservation protocol via an interworking function (IWF).

FIG. 5 illustrates another embodiment in which separate reservations are combined into a single multi-level reservation protocol via an interworking function (IWF). The IWF acts as a protocol converter for reservation requests between different level devices in a path from the Talker node 202 to the Listener node 204.

As in the examples described above, the Talker node 202 may receive a request for a reserved data stream 110, where the request includes desired transmission parameters for the reserved data stream 110 (e.g., maximum jitter, minimum or maximum latency, resilience to network failures, and includes the requirement that the maximum toss rate due to congestion is 0, maximum bits/second, maximum packet size, maximum burst size, observation interval, etc.). The request may be received at any of the levels 302, 304, 306. In the example shown in FIG. 5, the request is received at the middle level 302 N. The Talker node 202 determines resources that must be dedicated in order to guarantee the requested transmission parameters. In some embodiments, a proposed path for a reserved data stream 110 has been identified (e.g., via RSVP-TE or other protocols). In other embodiments, the exemplary method can be used to identify a path for the reserved data stream 110.

A resource reservation request received at level N in a node triggers the IWF at that node to convert the level N reservation request to a level N−1 reservation request when an adjacent node downstream on the path is a level N−1 node. For example, if an L3 reservation request (e.g., a RSVP-TE Path Message) is received by a router and the next node on the path is a bridge, the IWF on the router may convert the L3 reservation request to an L2 reservation request (e.g., a MSRP declaration) and sends the L2 reservation request to the bridge. The L2 protocol data unit (PDU) contains both the L2 and L3 information. Upon the reservation request being propagated to another L3 device, such as a second router, the IWF on the second router may convert the L2 reservation request back to an L3 reservation request such that the unneeded L2 information is removed from the reservation request. Therefore, the reservation requests are able to seamlessly span devices of different levels through the use of the IWF.

In the example shown in FIG. 5, the Talker node 202 may receive a request for a reserved data stream 110 at the middle level 302. The Talker node 202 may also be referred to as a N level node. In response, the Talker node 202 may identify an adjacent node on a candidate path from the Talker node 202 to the Listener node 204. The adjacent node is a lower level 306 node 308, which may also be referred to as a N−1 level node.

Because the adjacent node is a lower level node 306, the middle level 302 request (e.g., a L3 request such as a RSVP-TE Path Message) for the reserved data stream 110 triggers the IWF on the Talker node 202 to convert the middle level 302 reservation request to a lower level 306 request. Accordingly, the Talker node 202 sends a lower level 306 reservation request "1" 502 (e.g., a L2 request such as a MSRP declaration that also includes the L3 request) with a requested QoS to node 308 (e.g., a bridge); node 308 propagates the lower level 306 reservation request as request "2" 504 to a peer node 310 (e.g., a bridge); node 310 propagates the lower level 306 reservation request as request "3" 506 (e.g., a L2 request such as a MSRP declaration that also includes the L3 request) to a peer node 312 (e.g., a router). Because the node 312 is a level N node, the IWF on the node 312 converts the lower level 306 reservation request back to a middle level 302 reservation request. Therefore, the IWF creates a virtual link between the two level N nodes 202 and 312 such that the middle level 302 reservation request is able to traverse one or more lower level 306 nodes.

Upon the node 312 receiving the middle level 302 reservation request from the IWF, the node 312 may identify an adjacent node on the candidate path from the Talker node 202 to the Listener node 204. As before, the adjacent node is a lower level 306 node 332, which may also be referred to as a N−1 level node.

Because the adjacent node is a lower level node 306, the middle level 302 request (e.g., a L3 request such as a RSVP-TE Path Message) for the reserved data stream 110 triggers the IWF on the node 312 to convert the middle level 302 reservation request to a lower level 306 request. Accordingly, the node 312 sends a lower level 306 reservation request "4" 508 (e.g., a L2 request such as a MSRP declaration that also includes the L3 request) with a requested QoS to node 332 (e.g., a bridge); node 332 propagates the lower level 306 reservation request as request "5" 510 (e.g., a L2 request such as a MSRP declaration that also includes the L3 request) to a peer node 328 (e.g., a router). Because the node 328 is a level N node, the IWF on the node 328 converts the lower level 306 reservation request back to a middle level 302 reservation request. Therefore, the IWF creates a virtual link between the two level N nodes 312 and 328 such that the middle level 302 reservation request is able to traverse one or more lower level 306 nodes.

Upon the node 328 receiving the middle level 302 reservation request from the IWF, the node 328 may identify an adjacent node on the candidate path from the Talker node 202 to the Listener node 204. The node 328 may identify the adjacent node is a middle level 306 node 344, which may also be referred to as a N level node. Because the adjacent node is a middle level node 302, the middle level 302 request (e.g., a L3 request such as a RSVP-TE Path Message) for the reserved data stream 110 may be passed directly to the middle level 306 node 334. That is, the IWF on node 328 is not needed to convert the reservation request in order for it to be propagated from node 328 to node 344. Accordingly, the node 328 sends a middle level 302 reservation request "6" 512 (e.g., a L3 request such as a RSVP-TE Path Message) with a requested QoS to node 344 (e.g., a router).

Upon the node 344 receiving the middle level 302 reservation request from node 328, the node 344 may identify an adjacent node on the candidate path from the Talker node 202 to the Listener node 204. As before, the adjacent node is a lower level 306 node 346, which may also be referred to as a N−1 level node.

Because the adjacent node is a lower level node 306, the middle level 302 request (e.g., a L3 request such as a RSVP-TE Path Message) for the reserved data stream 110 triggers the IWF on the node 344 to convert the middle level 302 reservation request to a lower level 306 request. Accordingly, the node 344 sends a lower level 306 reservation request "7" 514 (e.g., a L2 request such as a MSRP declaration that also includes the L3 request) with a requested QoS to node 346 (e.g., a bridge); node 346 propagates the lower level 306 reservation request as request "8" 516 (e.g., a L2 request such as a MSRP declaration that also includes the L3 request) to the Listener node 204. Because the Listener node 204 is a level N node, the IWF on the Listener node 204 converts the lower level 306 reservation request back to a middle level 302 reservation request. Therefore, the IWF creates a virtual link between the two level N nodes 344 and 204 such that the middle level 302 reservation request is able to traverse one or more lower level 306 nodes.

Once the reservation request has successfully propagated to the Listener node 204, a reservation confirmation reply may follow the same path back to the Talker node 202 to confirm the reservations. As such, the Listener node 204 sends a reservation acknowledgement message (e.g., a L3 request such as a RSVP Resv message) back to the Talker node 202. Because the adjacent node 346 on the path is a lower level 306 node, the IWF on the Listener node 204 converts the reservation acknowledgement message to a lower level 306 acknowledgement message. Accordingly, the Listener node 204 sends a lower level 306 acknowledgement message "9" 518 (e.g., a L2 request such as a MSRP ready declaration that includes the RSVP Resv message) to the lower level 306 peer node 346; node 346 then sends a reservation acknowledgement message "10" 520 (e.g., a L2 request such as a MSRP ready declaration that includes the RSVP Resv message) to node 344. The IWF on node 344 may convert the lower level 306 acknowledgment message back to a middle level 302 acknowledgement message for propagation back to node 328 in an acknowledgement message "11" 522 (e.g., a L3 request such as a RSVP Resv message).

At node 328, the adjacent node 332 on the path is a lower level 306 node, so the IWF converts the middle level 302 acknowledgement message to a lower level 306 acknowledgement message "12" (e.g., a L2 request such as a MSRP ready declaration that includes the RSVP Resv message) which is sent to the node 332. Node 332 propagates the lower level 306 acknowledgement message "13" 526 to node 312, which converts the lower level 306 acknowledgement message back to a middle level 302 acknowledgement message (e.g., a L3 request such as a RSVP Resv message).

At node 312, the adjacent node 310 on the path is a lower level 306 node, so the IWF converts the middle level 302 acknowledgement message to a lower level 306 acknowledgement message "14" 528 (e.g., a L2 request such as a MSRP ready declaration that includes the RSVP Resv message) which is sent to the node 310, which propagates the acknowledgement message back to node 308 in a lower level 306 acknowledgement message "15" 530 (e.g., a L2 request such as a MSRP ready declaration that includes the RSVP Resv message), which again propagates the acknowledgement message back to the Talker node 202 in a lower level 306 acknowledgement message "16" 532 (e.g., a L2 request such as a MSRP ready declaration that includes the RSVP Resv message). The IWF on the Talker node 202 converts the lower level 306 acknowledgement message back to the middle level 302 acknowledgement message. To this end, FIG. 5 shows request for service is made and confirmed for each device along the path in a single pass from the Talker node 202 to the Listener node 204 and back again through the use of the IWF.

Figure 6:
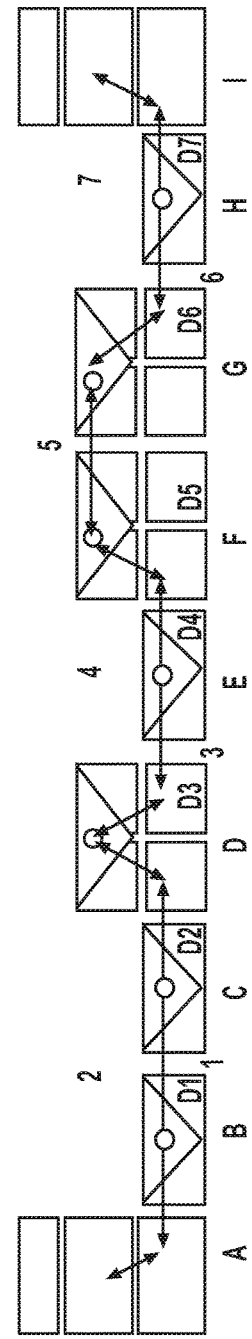
FIG. 6 illustrates latency along a network reservation path where the accumulated latency is passed according to the IWF.

FIG. 6 illustrates latency along a network reservation path where the accumulated latency is passed according to the IWF. Each node inserts into the reservation requests, a total accumulated delay. Therefore, regardless of whether an adjacent node is at the same or a different level, the accumulated delay may simply be accumulated along the reservation request path from the Talker node 202 to the Listener node 204.

While the example provided above is directed to the determination of a total accumulated delay along the path, other QoS or transmission parameters (e.g., jitter, latency, resilience to network failures, maximum toss rate due to congestion, maximum bits/second, maximum packet size, maximum burst size, observation interval, etc.) may be accumulated along the path as aggregate transmission parameters. Parameters such as the accumulated maximum guaranteed end-to-end latency are carried and incremented along the path of the reservation by the protocol. Thus, end-to-end latency can be computed and reported to the users. Also, that latency can be compared to the latency required by the stream, and the reservation can fail if that requirement is not met.

As discussed above, the request for a reserved data stream 110 includes desired transmission parameters. If the end-to-end aggregate transmission parameters of a candidate path do not conform to the desired transmission parameters for the reserved data stream 110, the candidate path will fail and the resource reservations made along the candidate path may be released.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments, but should be defined only in accordance with the following claims and their equivalents.

What is claimed is:

1. A method of multiple level resource reservation for a data stream in a peer-to-peer protocol, comprising:
    making a resource reservation request at a first layer; and
    subsequently requesting resource reservation request at a second layer, wherein the second layer is higher than the first layer;
    wherein, if the resource reservation request at the first layer fails, then failing the resource reservation at the second layer;
    wherein if the resource reservation request at the second layer fails, then withdrawing the resource reservation at the first layer.

2. The method of claim 1, wherein the resource reservation request at the first layer is made across a series of adjacent nodes, the series of adjacent nodes having a starting node and an ending node.

3. The method of claim 2, wherein the series of adjacent nodes includes at least one intermediate node, the method further comprising, if the resource reservation request at the first layer can be made, receiving at the at least one intermediate node and the starting node an acknowledgment that the resource reservation request at the first layer can be made.

4. The method of claim 2, wherein the resource reservation request at a second layer is made from a first node to a second node, where the first node is the starting node and the second node is the ending node.

5. The method of claim 4, further comprising, if the resource reservation request at the second layer can be made, receiving at the first node an acknowledgment that the resource reservation request at the second layer can be made.

6. The method of claim 1, wherein the resource reservation request at the first layer includes one or more transmission parameter(s) related to transmission of the data stream.

7. The method of claim 6, wherein the one or more transmission parameter(s) associated with the request at the first layer includes at least one of bandwidth, delay, latency, and jitter.

8. The method of claim 6, wherein the one or more transmission parameter(s) associated with the request at the first layer is carried through the series of nodes and incremented in the reservation request at the first layer between each adjacent nodes in the series of adjacent nodes.

9. A method of multiple level resource reservation in a peer-to-peer protocol, comprising:
    making a resource reservation request across a series of adjacent nodes in one of a first layer and a second layer, the first layer and second layer being adjacent, the series of adjacent nodes having a starting node and an ending node; and
    passing one or more transmission parameter(s) between adjacent nodes in different ones of the first layer and the second layer according to an interworking function.

10. The method of claim 9, wherein protocol data units in the first layer include one or more transmission parameter(s) for the first layer and the second layer between adjacent nodes in the first layer but not between adjacent nodes in the first layer and the second layer.

11. The method of claim 10, wherein the internetworking function generates one or more new transmission parameter(s) for the first layer after the reservation request passes between the second layer and the first layer.

12. The method of claim 10, wherein the one or more transmission parameter(s) for the first layer includes at least one of bandwidth, delay, latency, and jitter.

13. The method of claim 9, further comprising passing an acknowledgement that the reservation request is successful from the ending node to the starting node.

14. The method of claim 9, wherein intermediate nodes are located between the starting node and the ending node, and wherein the reservation request is made at each intermediate node.

15. The method of claim 14, wherein protocol data units in the first layer include one or more transmission parameter(s) for the first layer and the second layer between adjacent nodes in the first layer but not between adjacent nodes in the first layer and the second layer.

16. The method of claim 15, wherein the one or more transmission parameter(s) for the first layer includes at least one of bandwidth, delay, latency, and jitter.

17. The method of claim 15, wherein the internetworking function generates one or more new transmission parameter(s) for the first layer after the reservation request passes between the second layer and the first layer.

18. The method of claim 14, further comprising passing an acknowledgement that the reservation request is successful from the ending node to the starting node.

19. An apparatus configured for making multiple level resource reservation for a data stream via a peer-to-peer protocol, the apparatus comprising:
    a processor; and
    a memory having instructions stored thereon, wherein execution of the instruction cause the processor to:
    make a resource reservation request at a first layer; and
    subsequently requesting resource reservation request at a second layer, wherein the second layer is higher than the first layer;
    wherein, if the resource reservation request at the first layer fails, then failing the resource reservation at the second layer;
    wherein if the resource reservation request at the second layer fails, then withdrawing the resource reservation at the first layer.

20. The apparatus of claim 19, wherein the apparatus is a router or a switch.

* * * * *